US005410442A

United States Patent [19]

Pohl et al.

[11] Patent Number: 5,410,442

[45] Date of Patent: Apr. 25, 1995

[54] ELECTROMECHANICAL PROTECTION DEVCIE

[75] Inventors: Fritz Pohl, Hemhofen; Wilfried Jaehner, Nürnberg, both of Germany

[73] Assignee: Siemens Aktiengesellschaft, München, Germany

[21] Appl. No.: 12,836

[22] Filed: Feb. 3, 1993

[30] Foreign Application Priority Data

Feb. 17, 1992 [DE] Germany ........................ 42 04 729.3

[51] Int. Cl.[6] ........................ H02H 3/00; H01H 47/14

[52] U.S. Cl. ........................................ 361/94; 361/102; 361/169.1; 361/189; 361/195

[58] Field of Search ...................... 361/160, 166, 169.1, 361/170, 175, 187, 199, 190, 195, 196, 93, 94, 100, 101, 102; 307/132 E

[56] References Cited

U.S. PATENT DOCUMENTS

| | | | |
|---|---|---|---|
| 3,985,713 | 10/1976 | Frisch et al. | 260/77.5 |
| 3,999,078 | 12/1976 | Udvardi-Lakos | 307/66 |
| 4,012,673 | 3/1977 | Saarem et al. | 361/196 |
| 4,225,895 | 9/1980 | Hjertman | 361/8 |
| 4,276,631 | 6/1981 | Fujita et al. | 361/195 |
| 4,578,734 | 3/1986 | Delbosse | 361/190 |
| 4,725,911 | 2/1988 | Dieppedalle et al. | 361/8 |

FOREIGN PATENT DOCUMENTS

| | | |
|---|---|---|
| 2584529 | 1/1987 | France . |
| 2312238 | 9/1973 | Germany . |
| 2532593 | 1/1977 | Germany . |
| 2702181 | 7/1979 | Germany . |
| 3236733 | 4/1984 | Germany . |
| 3341947 | 5/1985 | Germany . |
| 3710520 | 10/1988 | Germany . |
| 3833128 | 4/1990 | Germany . |
| 4012470 | 10/1991 | Germany . |
| 4040359 | 7/1992 | Germany . |
| 468070 | 3/1969 | Switzerland . |
| 2156155 | 10/1985 | United Kingdom . |

*Primary Examiner*—Jeffrey A. Gaffin
*Assistant Examiner*—Ronald W. Leja
*Attorney, Agent, or Firm*—Kenyon & Kenyon

[57] ABSTRACT

A hybrid switch is provided for switching a sink on and off. The hybrid switch contains a first semiconductor switch with a commutation switch. According to the present invention, a magnetic drive includes a first magnetic coil through which short-circuit current flows. A second semiconductor switch is connected in series with a second magnetic coil that series being connected in parallel to the series connection of the first magnetic coil and the sink. Short circuit flows through the first magnetic coil via the commutation switch which bridges at least the first semiconductor switch.

9 Claims, 4 Drawing Sheets

ELECTROMECHANICAL PROTECTION DEVCIE

BACKGROUND OF THE INVENTION

The present invention relates to an electromechanical protection device for a semiconductor switch to which a commutation switch is assigned.

"Hybrid switches" are combinations of semiconductor switches and mechanical switches. The mechanical switch carries a continuous current when in a "switched-on" state, while the semiconductor switch permits the current branch to be turned on and off without any arc. Since semiconductor switches are not resistant to short circuits, they require special protection devices against overly high current loads.

A known embodiment of a switching device for a sink contains a series circuit of a mechanical switch with a semiconductor switch. This arrangement switches the sink on and off in rated operation, without any arc. The semiconductor switch is switched in parallel with a commutation contact, which is provided with a drive. In the event of a short circuit, the mechanical switch is triggered by its n-trigger (or tripping device). The switching arc commutates from the contact point on a runner and is finally separated and shut off in an extinction chamber, by means of extinction plates. By commutation of the arc from the contact point to the runner, the semiconductor current branch is switched idle to the fixed contact of the mechanical switch, and the $I^2t$ heat load of the semiconductor reaches only about 1/10 to 1/20 of the forward $I^2t$ value. However, the semiconductor switch can be exposed to current changes with a steep increase by arc flashback between the runner and the fixed contact (U.S. Pat. No. 4,725,911).

An objective of the present invention is to improve such a known electromechanical protection device for the semiconductor switch. In particular, the commutation switch is supposed to conduct the current during rated operation and quickly relieve the semiconductor switch in case of short circuit, at the same time.

SUMMARY OF THE INVENTION

The aforementioned objective is met according to the present invention, by providing a self-protecting hybrid switch for connecting a supply line to a load and having a first semiconductor switch, a second semiconductor switch, a commutation switch, and a magnetic drive. The magnetic drive includes a first magnetic coil through which short-circuit current flows and a second magnetic coil. The first and second magnetic coils of the magnetic drive actuate the commutation switch. The second semiconductor switch is connected in series with the second magnetic coil. The load is connected in series with the first magnetic coil. The series connection of the second semiconductor switch and the second magnetic coil is connected in parallel with the series connection of the first magnetic coil and the load. The commutation switch is switched on after the first semiconductor switch, by the second magnetic coil of the magnetic drive, in rated operation, so that the first semiconductor switch takes on the switching function in rated operation of the sink, but is relieved of the rated current. In rated operation, an electrical power loss of the first semiconductor switch is therefore avoided by the commutation switch that is turned on. The second magnetic coil is excited with a control current to switch the first semiconductor switch on and off in operation. Both magnetic coils operate in the same magnetic trigger device and are supplied from the same phase, so that no countercurrent (i.e., oppositely oriented) magnetization can occur.

If the first semiconductor switch is switched to short circuit, the commutation switch is switched on, without delay, by the first magnetic coil, through which the short circuit current flows, preferably within 1 ms, and the first semiconductor switch is immediately relieved.

In an embodiment of the power supply of the sink with a preceding power switch, which takes on short circuit protection, a thermal trigger can also be switched in series with the semiconductor switch, which trigger is actively connected with a control device for the two semiconductor switches and issues a triggering signal to this semiconductor switch in case of a current overload.

The first magnetic coil is also relieved when the commutation switch is turned on in rated operation.

DETAILED DESCRIPTION

Figure 1:
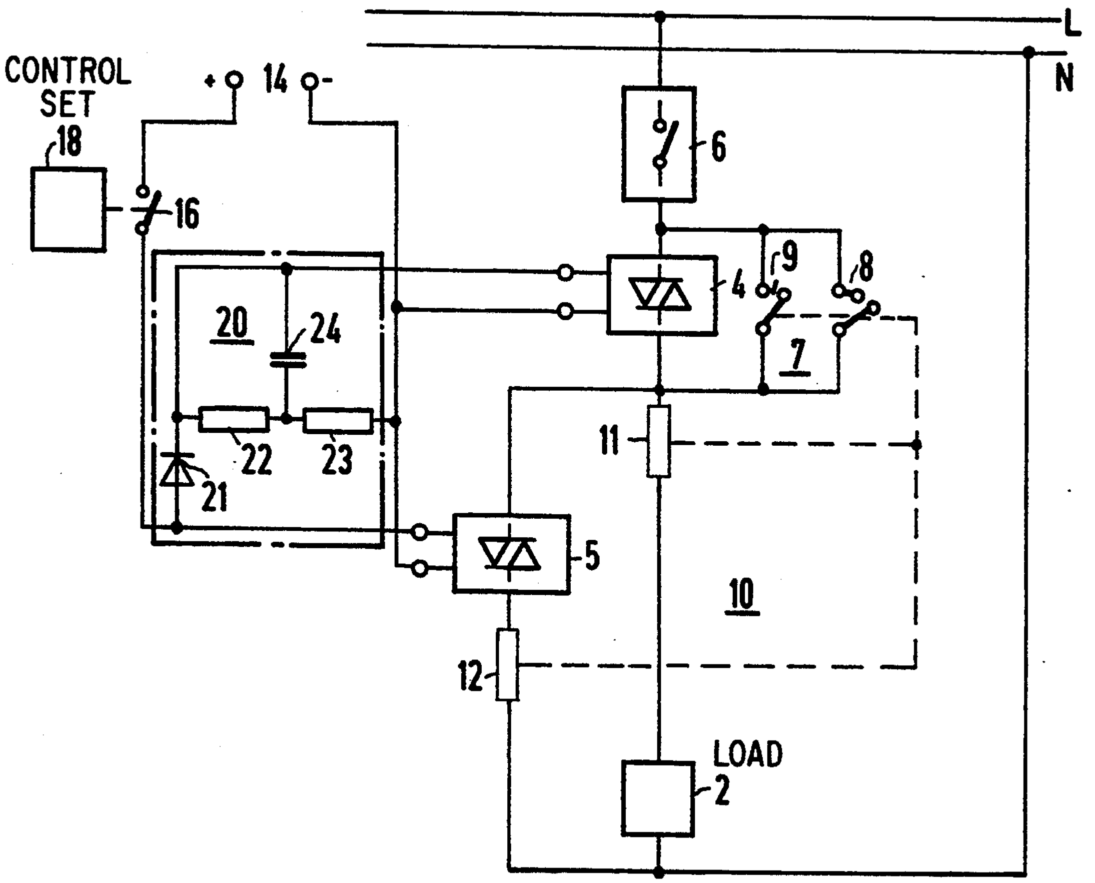
FIG. 1 is a schematic which illustrates an embodiment of an electromechanical protection device according to the present invention.

In the embodiment of an electromechanical protection device according to FIG. 1, a sink 2 is connected to a power supply line via a semiconductor switch 4 (e.g., two anti-parallel thyristors) and a serially connected power switch 6. A commutation switch 7 having a parallel non-delayed switch contact 8 and a delayed switch contact 9 is arranged across the semiconductor switch 4 so that the semiconduetor switch 4 is bridged by the commutation switch 7. The commutation switch 7 is a magnetic drive 10 which has two magnetic coils 11 and 12. The first magnetic coil 11 is arranged in series between the first semiconductor switch 4 and the sink 2. The second magnetic coil 12 is arranged in series with a second semiconductor switch 5, this series arrangement being connected in parallel with the series connection of the magnetic coil 11 and the sink 2.

A control voltage source 14 and a control contact 16 are provided for the semiconductor switches 4 and 5. The control contact 16 can be activated by a control set 18. The commutation switch 7 is activated by the second magnetic coil 12 of the magnetic drive 10 such that, in rated operation of the sink 2, it is switched on after the semiconductor switch 4 and switched off before the semiconductor switch 4.

The semiconductor switch 4 can therefore preferably be provided with a shutoff delay 20, which can be structured in known manner and can contain a diode 21, and a series circuit of resistors 22 and 23 as well as a capacitor 24, for example. The RC element consisting of the resistor 22 and the capacitor 24 determines the shut-off delay of the semiconductor switch 4.

To switch on the sink 2, a switch-on signal is issued to the two semiconductor switches 4 and 5 by the control set 18, via the control switch 16, causing the semiconductor switches 4 and 5 to be switched on without delay. The magnetic coil 12 receives a control current via the semiconductor switches 4 and 5, which activates the magnetic drive 10 and switches the commutation switch 7 on. A shut-off signal reaches the semiconductor switch 5 without delay and switches the commutation switch 7 off with the magnetic coil 12. With the predetermined time delay, the semiconductor switch 4 and thus the sink 2 are also switched off in rated operation of the sink 2. While the commutation switch 7 is necessarily switched on immediately after the semiconductor switches 4 and 5 are switched on, because of its response time, switching the semiconductor switch 4 off is delayed by the shut-off delay 20 such that the commutation switch 7 can open without arcing.

This electromagnetic protection device for the semiconductor switch 4 is provided for remote-controlled, relatively frequent switching of the sink 2, where the electrical losses of the semiconductor switch during the switching processes are small and no cooling element is needed. To reduce the number of lead connections, the neutral connection of the power supply line can be passed in between the magnetic coil 12 and the neutral line by means of a control connection, and connected internally. The line protection is taken over by the preceding power switch 6 in this embodiment which can then preferably be a protected power switch.

The commutation switch 7 remains in the switched-on state as long as the sink 2 is supposed to remain on. If a short-circuit occurs while the commutation switch 7 is closed, the short-circuit current flows via the power switch 6 and the switch contact 8. The electrical components switched in parallel to the switch contact, particularly the semiconductor switch 4, are thus not burdened by the short-circuit current. Since the second magnetic coil 12 only switches the switch contact 8 on after a predetermined delay, for example after several milliseconds, activation of the commutation switch 7 by the first magnetic coil 11 is required within a short time, which generally does not significantly exceed 1 ms and preferably lies between 0.5 ms and 1 ms, to protect the semiconductor switch 4 from any short-circuits which might occur before activation (i.e., during delay before which contact switch 8 is switched on). The two magnetic coils 11 and 12 generate a rectified magnetic field and thus do not disturb each other during their simultaneous operation. In the closed state of the switch contact 8, the semiconductor switch 4 is therefore already protected against short-circuit consequences. When the switch contact 8 is switched on in response to a short circuit, protection is assured by the very rapid switching of the switch contact 8 by means of the first magnetic coil 11. The commutation switch 7 receives such strong contact force by means of the magnetic drive 10 with the magnetic coils 11 and 12 that it can carry the short-circuit current, without opening from current forces.

Figure 2:
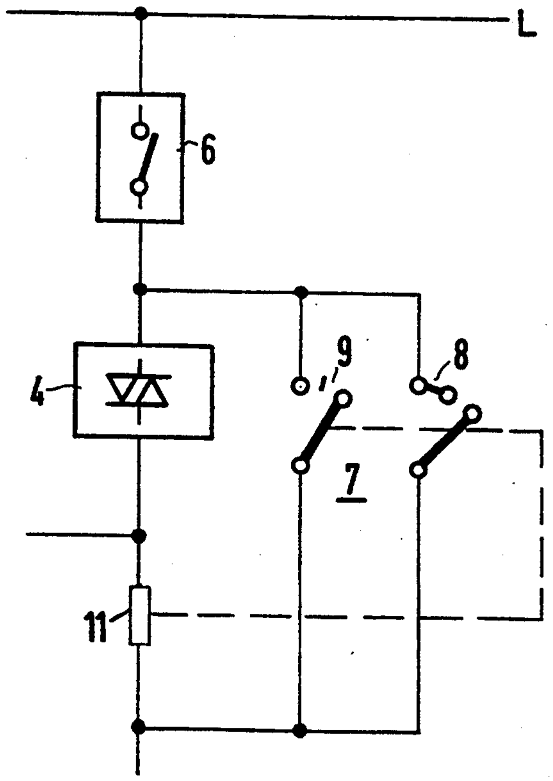
FIGS. 2 and 3 are schematics which show another embodiment of the device of the present invention.

In some circumstances, having the commutation switch 7 bridge the series circuit of the semiconductor switch 4 with the magnetic coil 11 as shown in FIG. 2 is advantageous. In case of short circuit, the magnetic coil 11 thus switches both switch 4 and commutation off.

Figure 3:
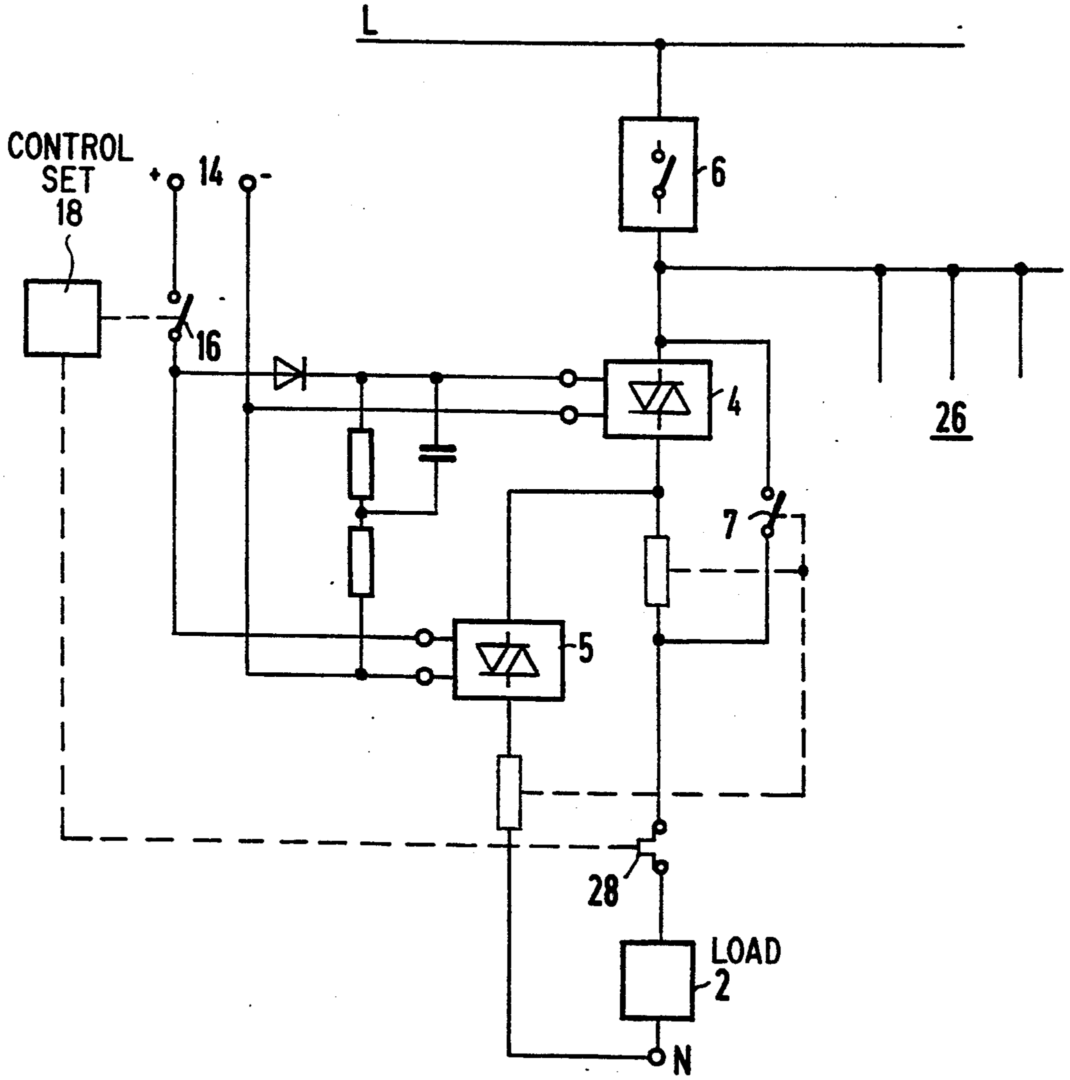

In the embodiment of the device according to FIG. 3 (which preferably also includes several branchings 26) a power switch is provided as the preceding switch 6, which takes over the short-circuit protection of the sink 2. In this embodiment, a trigger (particularly a thermal trigger 28) can be arranged in series with the sink 2 (e.g., between the sink 2 and the semiconductor switch 4) thereby actuating the control switch 16 in the event of excess current. The control switch in turn activates the semiconductor switches 4 and 5 and thus also the commutation switch 7.

Figure 4:
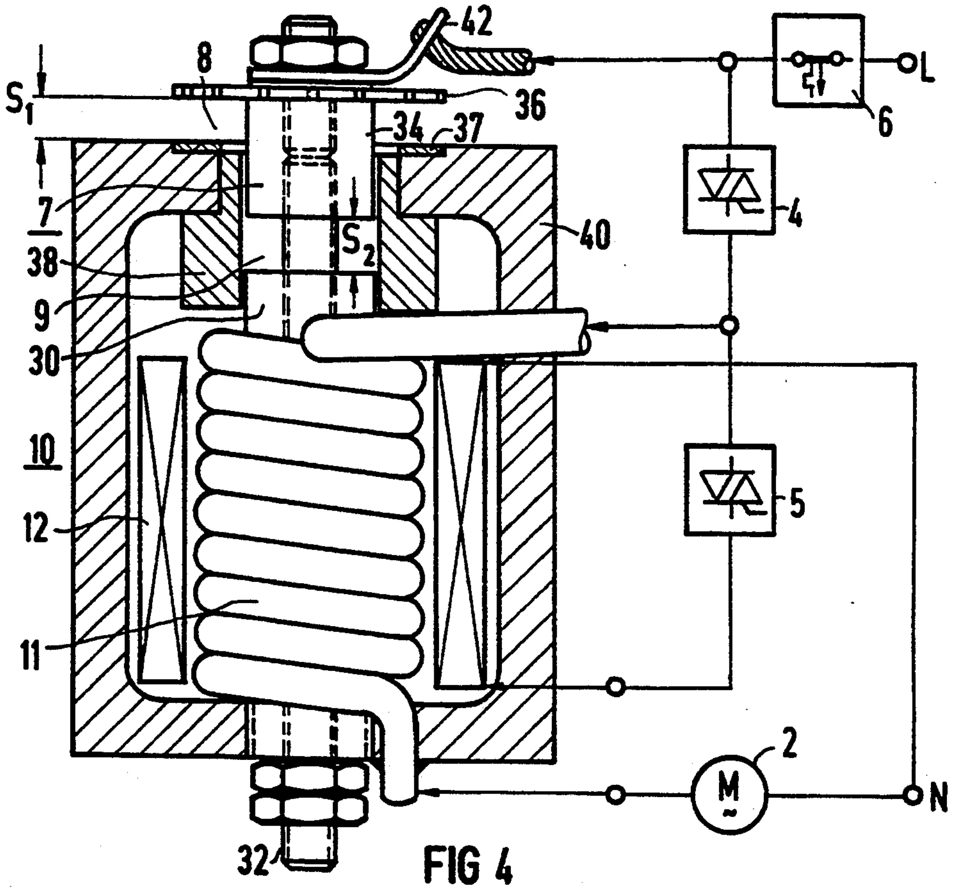
FIG. 4 is a partial cross-sectional side view of an embodiment of the protection device of the present invention as a hybrid switch.

In the preferred embodiment of a magnetic drive 10 with its two magnetic coils 11 and 12, and the commutation switch 7 as a hybrid switch, according to FIG. 4, a magnetic core 30 is concentrically surrounded by the first magnetic coil 11 and the second magnetic coil 12. The magnetic core 30 is rigidly connected with a plunger (i.e., a push rod) 32 made of insulating material. On the plunger 32, a rotor 34 is mounted to permit axial rotation. The rotor 34 forms the common movable part of the commutation switch 7 with its two switch contacts 8 and 9. A movable contact crown 36 and a fixed contact ring 37 form the switch contact 8, while the rotor 34 forms the delayed switch contact 9, as the movable contact, with the fixed magnetic core 30. The switch contact 8 has a smaller contact gap $s_1$ (e.g., $s_1=2$ mm), than the contact gap $s_2$ of switch contact 9 (e.g., $s_2=3$ mm). As a result, switch contact 8 acts as a prior contact, so that the contact of the delayed switch 9 closes and opens without an arc in every case. The rotor 34 is arranged for axial motion in an insulating sleeve 38. This insulating sleeve 38 serves as a guide element for the rotor 34 and thus for the switch contact 9, and insulates the yoke 40 of the magnetic drive 10 relative to the rotor 34.

To increase the magnetic flow in the magnetic drive 10, the insulating sleeve 38 can particularly consist at least partially of ferrite material. The bottom end of the magnetic coil 11, which is designed for the short-circuit current, can be connected in electrically conductive manner with the yoke 40, for example. At this end, a motor provided as a sink 2 is also connected. The upper end of the coil 11 is connected with the two semiconductor switches 4 and 5. The second magnetic coil 12, provided for rated operation, is connected between the semiconductor switch 5 and the neutral pole N of the power supply. The power switch 6, for example a protected power switch, and also the first semiconductor switch 4 are connected with the connection terminal of the commutation switch 7, not shown in greater detail.

The magnetic core 30 can be provided with a short-circuit ring (not shown in the figure) in its pole surface facing the switch contact 9, which encloses part of the pole surface, preferably about 50% of the pole surface. The main magnetic flow between the rotor 34 and the magnetic core 30 induces an electrical current in the short-circuit ring. This generates two magnetic partial flows with opposite signs in the pole surfaces of the rotor 34 and the magnetic core 30. The total magnetic flow results from the superimposition of the magnetic partial flows on the main magnetic flow. The induction distribution over the air gap cross-section which is part of the total flow is characterized by the fact that the induction does not become zero at any point in time when the coils 11 or 12 are switched on (50 Hz), and therefore the magnetic force always remains greater than zero. In this way, contact uncertainties at the contact devices are avoided.

Figure 5:
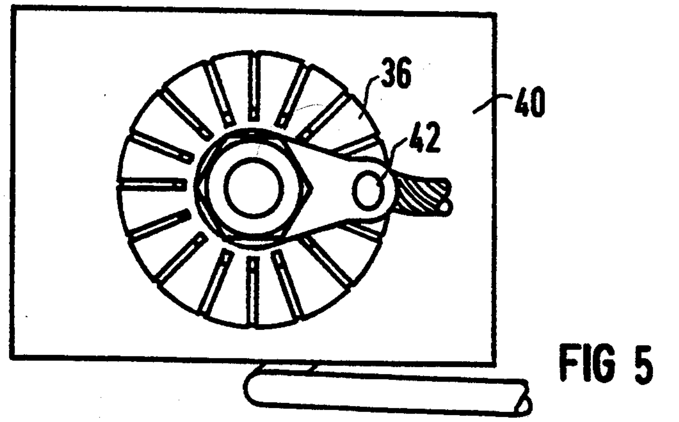
FIG. 5 is a top view of the hybrid switch of FIG. 4.

In the top view of FIG. 5, an embodiment of the contacts 36 of the commutation switch 7 as a contact crown is shown, arranged to move with the rotor 34 above the yoke 40. As shown in FIG. 4, the connection lead 42 is connected with the power switch 6 and the semiconductor switch 4.

Deviating from the embodiment according to FIG. 3, in case of a short circuit at the sink 2, a device (not shown in the figure) can be controlled, interrupting the signal line of the magnetic trigger 10 and activating a lock to prevent it from being switched on again.

For a three-pole protection device, the embodiments according to the embodiments of FIGS. 1 to 4 can also, be integrated in a three-pole device with three line connections L1, L2, L3 and a connection of the neutral line N, i.e. in a four-pole device with line connections L1, L2, L3 and N. The control signals of the control contact 16 then act on all three phases and switching on or off always takes place for three poles or four poles, respectively.

What is claimed is:

1. A self-protecting hybrid switch device for connecting a load between a phase line and a neutral line of an electrical circuit, the hybrid switch device comprising;

a) a first semiconductor switch;

b) commutation switch bridging said first semiconductor switch;

c) a magnetic drive, i) for switching on said commutation switch, and ii) including a first magnetic coil through which short-circuit current flows, and a second magnetic coil, each of said first and second magnetic coils being adapted to actuate said commutation switch; and d) a second semiconductor switch i) being connected in series with said second magnetic coil wherein the load is connected in series with said first magnetic coil, and wherein said series connection of said second semiconductor switch and said second magnetic coil is connected in parallel with said series connection of said first magnetic coil and said load.

2. The device of claim 1, wherein said first semiconductor switch is provided with a shut-off delay whereby said first semiconductor switch is shut off after said second magnetic coil activates said commutation switch.

3. The device of claim 1, wherein said commutation switch comprises a non-delayed switch contact and a delayed switch contact connected in parallel, each of said non-delay switch contact and delayed switch contact defining air gaps when opened.

4. The device of claim 3, further comprising an insulating sleeve which includes ferrite material and surrounds the air gap of said delayed switch contact of said commutation switch.

5. The device of claim 1, wherein said commutation switch bridges a series connection of said first semiconductor switch with said first magnetic coil.

6. The device of claim 1, further comprising a control circuit for controlling said first semiconductor circuit wherein said control circuit includes a control contact, said control contact being connected, via a thermal trip. in series with said load.

7. The device of claim 1 wherein said magnetic drive contains a magnetic core, a yoke surrounding said magnetic core, a rotor, and an electrically. insulating sleeve arranged between said magnetic core and said yoke, and acting as a guide element for said rotor.

8. The device of claim 7, wherein said insulating sleeve includes ferrite material and surrounds an air gap of a switch contact of said commutation switch.

9. The device of claim 1, wherein said self-protecting hybrid switch has a multiple pole design.

* * * * *